Feb. 13, 1923.
R. C. HOLMAN
VALVE
Filed Aug. 7, 1920
1,444,790
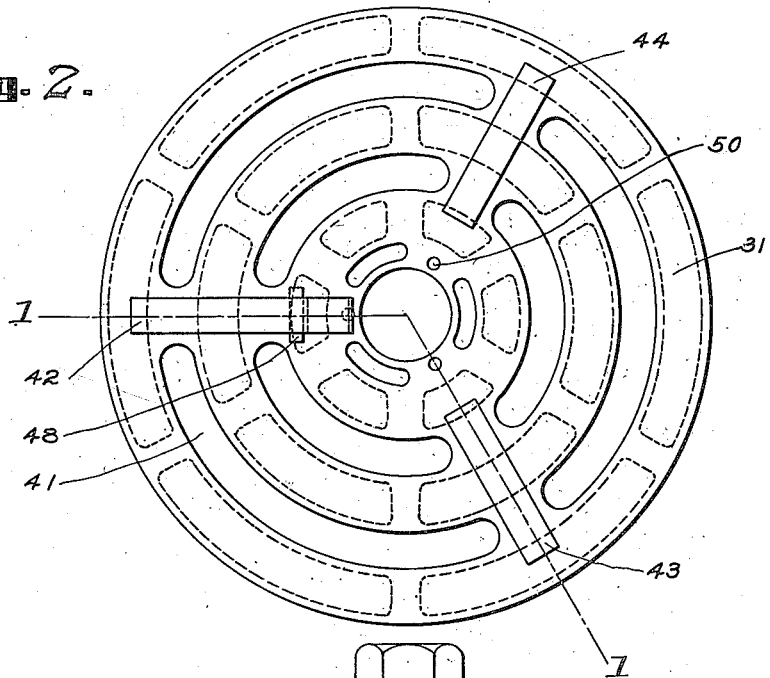
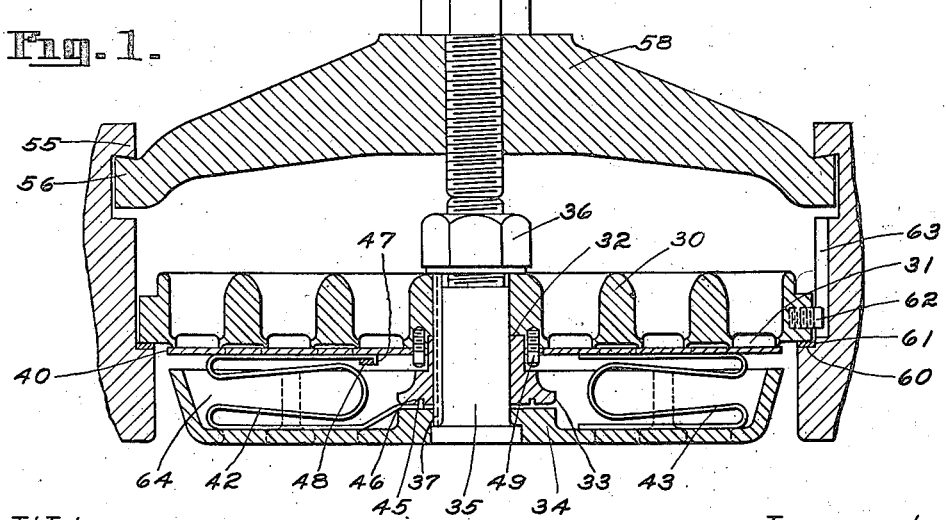
Witnesses
Chas. G. Graef.
Inventor
Robert C. Holman
By
Lee Morehead
Attorney Patented Feb. 13, 1923.

1,444,790

UNITED STATES PATENT OFFICE.

ROBERT C. HOLMAN, OF HAMILTON, OHIO, ASSIGNOR TO THE HOOVEN, OWENS, RENTSCHLER COMPANY, OF HAMILTON, OHIO, A CORPORATION OF OHIO.

VALVE.

Application filed August 7, 1920. Serial No. 401,887.

*To all whom it may concern:*

Be it known that I, ROBERT C. HOLMAN, a citizen of the United States of America, residing at Hamilton, in the county of Butler and State of Ohio, have invented certain new and useful Improvements in Valves, of which the following is a full, clear, and exact description.

This invention relates to pumps, compressors, or the like, and more particularly to an improved type of apparatus of this character, and to an improved valve for use therein.

One object of the invention is to provide an improved type of valve for use in such a blowing engine or compressor.

Other objects and advantages will be apparent from the description set out below, when taken in connection with the accompanying drawing.

In the drawing, in which like characters of reference designate like parts throughout the several views thereof, Fig. 1 is a sectional view through one of the valves used in the compressor cylinder, the section being along the line 1—1 of Fig. 2;

Fig. 2 is a view of the valve disc with certain parts of the valve structure removed to more clearly show the arrangement of the springs, and the details of the valve disc structure.

This valve consists of a seat member 30 having a plurality of arcuate ports 31 therein. Mounted within the depression 32 in the valve seat is a spacing member or distance piece 33 the end of which cooperates with a stop plate 34. Passing through the stop plate 34, the spacing member 33 and the valve seat 30 is a bolt 35 having a nut 36 threaded upon the end thereof, whereby the valve seat, spacing member and stop plate are held rigidly in proper relation to each other. A key 37 is provided which, when the device is in assembled position sets in a suitable key-way, and holds these three members against rotative movement relative to each other. Mounted upon the spacing member 33 is a valve disc 40 having a plurality of arcuate ports 41 therein so arranged that, when the valve is in assembled position, they are out of register with the ports 31 of the valve seat. That is, when in closed position, the ports of the valve disc and of the valve seat register respectively with blank spaces of the seat and disc. Interposed between the valve disc and the stop member are a plurality of radially arranged springs 42, 43 and 44, three of these springs being shown, although a greater or less number may be used if desired. It has been found that three springs give very satisfactory operation. Each of these springs consists of a strip of metal bent zigzag, in substantially the form shown, the springs being under such tension that they normally urge the valve disc towards, and into contact with, the valve seat. One of these springs, spring 42 shown in the drawing, has one end 45 extended longer than the other, this end being turned over, as shown, and adapted to cooperate with a groove 46 in the spacing member 33. The other end 47 of the spring 42 is also overturned, this end of the spring being slidably held beneath a strap 48 which is rigidly attached to the valve disc. As shown this strap is permanently attached to the valve disc by means of spot welding, but other means of attachment may be used if desired. The over-turned end 47 of the spring is adapted to cooperate with the strap 48 to hold the spring in slidable but permanent connection with the valve disc. Carried by the valve seat are a plurality of guiding lugs 49, which project through holes 50 in the valve disc to keep said valve disc in properly arranged position. These lugs may be dispensed with if desired. The springs 43 and 44 are also, preferably, attached to the valve disc, as by welding, to facilitate assembling.

Each of the ports, in which these valves are mounted, has undercut lugs 55, with which the lugs 56, carried by the member 58 cooperate. Located within the member 58 is a bolt 59. When the valve is inserted within one of the ports the member 58 is also introduced into the port and turned so that the lugs 56 cooperate with the undercut lugs 55. The bolt 59 is then tightened to clamp the seat member tightly against the shoulder 60, which is provided in each of the ports. The stop plate 34 has a plurality of pockets 64 for housing the springs when the valve is in assembled position. When assembled with the overturned end 47 of the spring 42 within the groove 46, and the nut 36 properly tightened the parts of the valve are held in proper arrangement. The spacing member 33 and the guiding lug 48 tend, during operation, to keep the valve properly centered. If the valve, however, during use is in a vertical position it is obvious that wear would normally occur tending to cause displacement of the valve disc, to alter the relative position of the ports 31 and 41, to thus permit of leakage through valve. In order to substantially eliminate this wear, and consequent leakage, the spring 42 is given the construction and arrangement shown. The valve, when used in vertical position, is always so placed that the spring 42 is vertically arranged with the ends 45 and 47 downward. Inasmuch as one end of this spring is rigidly held by, or attached to, the spacing member, and the other end of the spring is over-turned to cooperate with the strap 48, which is rigidly attached to the valve disc, it is evident that the valve disc will be held in suspended position by means of the spring. In this way excessive wear of the valve disc where it tends to contact with the spacing member and the lugs 49 is prevented. In actual practice this construction insures a floating of the valve member in position with no, or substantially no, contact with the spacing member, or pins 49.

Normally a packing 61 is interposed between the seat 30 and the shoulder 60 to prevent leakage. And a member 62 is usually attached to the seat 30, which cooperates with a groove 63 within the wall of the port to prevent rotation of the valve within said port.

While the forms of mechanism herein shown and described constitute preferred forms of embodiment of the invention, it is to be understood that other forms might be adopted, all coming within the scope of the claims which follow.

I claim—

1. A valve for compressors, pumps and the like, comprising in combination; a valve seat; a stop member; spacing means for holding said seat and stop member in definitely spaced relation; a valve disc arranged between the valve seat and the stop member; and a plurality of radially arranged springs interposed between the disc and stop member, and normally urging said disc against its seat, said springs consisting of flat strips of metal bent zig-zag; one only of said springs having one end thereof slidably and permanently engaged with the valve disc and the other end rigidly attached to the said spacing member.

2. A valve for compressors, pumps and the like, comprising in combination; a valve disc; a valve seat cooperating with said valve disc; radially arranged springs cooperating with said valve disc, and having a multiple curvature; one only of said springs being held in slidable and permanent engagement with said disc, and a valve spindle for holding fast the other end of said one spring.

3. In a check valve for blowers, compressors and the like, a reciprocable valve, a seat therefor; a stop member for limiting the opening movement thereof; a spacing member for holding said valve seat and stop member in definitely spaced relation; and a plurality of springs for maintaining said valve on its seat, said springs each consisting of a flat strip of metal bent zig-zag to provide a plurality of leaves, one end leaf of one of said springs being permanently and slidably engaged with said valve and the other end being detachably engaged with said spacing member.

4. In a valve for pumps, and the like, a valve disc; a valve seat therefor; a stop member for limiting opening movement of the valve disc; a spacing member for holding the valve seat and stop member in definitely spaced relation; and a plurality of springs for normally urging said valve disc towards its seat, one of said springs having one end thereof permanently but slidably attached to the valve disc, and the other end thereof adapted for rigid attachment to the spacing member.

5. In a valve for pumps, and the like, a valve disc, a strap carried by said valve disc; a valve seat therefor; a stop member for limiting opening movement of the valve disc; a spacing member for holding the valve seat and stop member in definitely spaced relation; and a plurality of springs for normally urging said valve disc toward its seat, one of said springs having one end thereof rigidly attached to the spacing member, and the other end slidably engaged beneath the said strap, the end of the spring engaged beneath said strap having one end thereof upturned, the construction being such that when the valve is in vertical position the upturned end of said spring will cooperate with the said strap to sustain the said valve disc.

In testimony whereof I hereto affix my signature.

ROBERT C. HOLMAN.

Witnesses:
P. A. FRANSSON,
W. J. COAKLEY.